Patented Mar. 28, 1933

1,903,094

UNITED STATES PATENT OFFICE

MARIUS S. DARROW, OF ST. LOUIS, MISSOURI, AND LEO S. SWEENEY, OF GRANITE CITY, ILLINOIS

PROCESS OF TREATING PETROLEUM OILS

No Drawing.   Application filed May 3, 1928.   Serial No. 274,957.

This invention relates to a process of treating petroleum oils, and consists in the novel procedure hereinafter disclosed.

Heretofore, the art has proposed various expedients to eliminate from petroleum distillates and other petroleum products the objectionable bodies present therein, such, for example, as sulphur, hydrogen sulphide and mercaptans and other ingredients that result in a bad odor, a positive doctor reaction and a positive reaction in the corrosion and gumming tests.

The usual character of treatment employed has included an acid treatment, a doctor treatment, redistillation and filtering. These various treatments have been used in sequence with varying degrees of success, but have failed to remove the objectionable bodies uniformly on all starting stock and the end product has widely varied in its characteristics. Moreover, the various stages of the treatment performed in sequence has resulted in a high cost of refining.

The sequential method of treatment has been unsuccessful largely because the physical chemical reaction in the acid treatment and doctor stages, while tending to reduce the amount of certain of the objectionable bodies, results in the formation of new bodies that remain in whole or in part in the oil stock and are carried over to the subsequent step of the treatment, affecting not only the reactions in the subsequent stage, but are carried over into the final product. For example, in the acid treatment with sulphuric acid to reduce the content of the unsaturated hydrocarbon, frequently various sulphur compounds are formed which not only interfere with the clarification of the oil through the neutralization treatment but remain in the oil after filtration. Similarly, by the doctor treatment, in an effort to remove the acid sulphur bodies, reactions occur which result in the sulphur bodies being redissolved in the stock in a modified form so that it frequently results that the sulphur content of the finished stock is greater than it was before the neutralization treatment.

It has been discovered that by combining the doctor treatment and the filtration step a very much improved product is obtained and the cost of refining the various petroleum products has been reduced.

The object of the invention is therefore to generally improve the known methods of treatment of petroleum oils by providing a single step whereby the neutralization and filtration of the product is accomplished in a single step instead of the present method of accomplishing the treatment in sequential steps.

The specific method of procedure comprises the filtration of the oil stock through a filter bed composed of neutralizing reagents and clarifying reagents, said reagents being so arranged that they form an intimate mixture in a comminuted state so that the neutralization and clarification are carried out jointly. This results in a greatly increased effectiveness of the reagents in neutralizing and clarifying the oil stock because of the inter-reaction between the components of the filter bed with each other and with the oil stock. Furthermore, the impurities precipitated by the reagents, instead of concentrating and collecting in more or less continuous mass, as occurs in the sequential treatment, are deposited as they are formed in the finely divided, non-continuous and porous mixture of the filter bed and keep in intimate contact with the reagents in the form in which they will not be redissolved.

In addition to the above mentioned advantages of the single step treatment of the present invention, it has been discovered that there is an added effectiveness due to the reactivity that the reagents possess and therefore possessing more effective chemical effectiveness than where the treatment is sequential and the reaction completed in each stage before the subsequent stage is brought into operation. For example, the precipitates, where held in intimate contact with the oil stock, themselves have a chemical effect or act as a catalyst in accomplishing the elimination of the undesirable ingredients in the oil stock.

Without restricting the general process of the present invention to any specific components of the filter bed, it has been found that the composition hereinafter set out results in producing an extremely satisfactory product from the usual character of petroleum distillates encountered in commercial practice. It has been found that, by passing the oil stock, after the sulphuric acid treatment and after removal of the sludge through a combined neutralizing and clarifying bed of a doctor reagent of sodium hydroxide and lead oxide combined with a mineral earth by one filtration, a commercially satisfactory product is produced. Specifically, a satisfactory formula for the filter bed includes a composition of: Fuller's earth $48\frac{7}{10}$ percent by weight; sodium hydroxide, $28\frac{7}{10}$ percent by weight; and lead oxide, $22\frac{6}{10}$ percent by weight. These reagents are comminuted and uniformly mixed to form a homogeneous bed which is placed in any ordinary filtering chamber and the treated stock is percolated through the filter bed and the filtrate withdrawn. The formation of the filter bed in a homogeneous and intermixed body, while accomplishing better results, is not entirely essential, as the reagents and the filtering material may be formed in separate layers.

We are aware that the invention may be modified in various particulars without departing from the nature and principle of the invention. We do not restrict ourselves unessentially, but what we claim and desire to secure by Letters Patent is:—

The continuous process of treating oils which consists in simultaneously neutralizing the acid bodies in the oil and filtering the discoloring bodies from the oil by passing the oil stock through a filter bed including Fuller's earth, sodium hydroxide and lead oxide compounded in the following proportions by weight: Fuller's earth $48\frac{7}{10}$ percent; sodium hydroxide, $28\frac{7}{10}$ percent; and lead oxide $22\frac{6}{10}$ percent.

MARIUS S. DARROW.
LEO S. SWEENEY.